(12) United States Patent
Blackmon et al.

(10) Patent No.: US 7,645,834 B2
(45) Date of Patent: Jan. 12, 2010

(54) CATALYST SYSTEM FOR PRODUCTION OF POLYOLEFINS

(75) Inventors: Kenneth P. Blackmon, Houston, TX (US); Joseph L. Thorman, League City, TX (US); David John Rauscher, Angleton, TX (US); Edwar S. Shamshoum, Gibsonia, PA (US); Christopher Bauch, Baton Rouge, LA (US)

(73) Assignee: Fina Technologies, Inc., Houston, TX (US)

(*) Notice: Subject to any disclaimer, the term of this patent is extended or adjusted under 35 U.S.C. 154(b) by 216 days.

(21) Appl. No.: 11/118,017

(22) Filed: Apr. 29, 2005

(65) Prior Publication Data

US 2006/0247396 A1 Nov. 2, 2006

(51) Int. Cl.
C08F 4/6392 (2006.01)
C08F 4/6592 (2006.01)
C08L 23/04 (2006.01)
C08L 23/10 (2006.01)

(52) U.S. Cl. .................... 525/240; 526/113; 526/114; 526/118; 526/119; 526/160; 526/124.3; 526/124.9; 526/170; 525/191

(58) Field of Classification Search ............... 525/191, 525/240; 526/113, 114, 118, 119, 124.3, 526/124.9, 160, 170
See application file for complete search history.

(56) References Cited

U.S. PATENT DOCUMENTS

| | | | |
|---|---|---|---|
| 4,271,060 A | 6/1981 | Hubby | 260/33.6 A |
| 4,543,399 A | 9/1985 | Jenkins, III et al. | 526/70 |
| 4,588,790 A | 5/1986 | Jenkins, III et al. | 526/70 |
| 5,001,205 A | 3/1991 | Hoel | 526/128 |
| 5,026,798 A | 6/1991 | Canich | 526/127 |
| 5,028,670 A | 7/1991 | Chinh et al. | 526/73 |
| 5,236,998 A | 8/1993 | Lundeen et al. | 525/52 |
| 5,317,036 A | 5/1994 | Brady, III et al. | 523/223 |
| 5,405,922 A | 4/1995 | DeChellis et al. | 526/68 |
| 5,436,304 A | 7/1995 | Griffin et al. | 526/68 |
| 5,456,471 A | 10/1995 | MacDonald | 273/195 A |
| 5,462,999 A | 10/1995 | Griffin et al. | 526/68 |
| 5,525,678 A | 6/1996 | Mink et al. | 525/246 |
| 5,589,555 A | 12/1996 | Zboril et al. | 526/64 |
| 5,616,661 A | 4/1997 | Eisinger et al. | 526/88 |
| 5,627,242 A | 5/1997 | Jacobsen et al. | 526/60 |
| 5,643,847 A | 7/1997 | Walzer, Jr. | 502/117 |
| 5,665,818 A | 9/1997 | Tilston et al. | 525/53 |
| 5,668,228 A | 9/1997 | Chinh et al. | 526/67 |
| 5,677,375 A | 10/1997 | Rifi et al. | 525/53 |
| 5,703,187 A | 12/1997 | Timmers | 526/282 |
| 5,747,406 A | 5/1998 | Reichle et al. | 502/117 |
| 5,849,852 A | 12/1998 | Koch et al. | 526/96 |
| 5,859,653 A | 1/1999 | Aoki et al. | 347/8 |
| 5,869,723 A | 2/1999 | Hinokuma et al. | 556/402 |
| 6,069,213 A | 5/2000 | Nemzek et al. | 526/113 |
| 6,127,484 A * | 10/2000 | Cribbs et al. | 525/191 |
| 6,136,747 A | 10/2000 | Kao et al. | |
| 6,147,173 A | 11/2000 | Holtcamp | 526/133 |
| 6,180,732 B1 | 1/2001 | Ewen | 526/127 |
| 6,180,735 B1 | 1/2001 | Wenzel | 526/142 |
| 6,207,606 B1 | 3/2001 | Lue et al. | 502/113 |
| 6,211,105 B1 | 4/2001 | Holtcamp | 502/103 |
| 6,214,949 B1 | 4/2001 | Reddy et al. | |
| 6,242,545 B1 | 6/2001 | Jejelowo et al. | 526/160 |
| 6,245,705 B1 | 6/2001 | Kissin | 502/117 |
| 6,245,868 B1 | 6/2001 | Agapiou et al. | 526/88 |
| 6,248,845 B1 | 6/2001 | Loveday et al. | 526/113 |
| 6,271,323 B1 | 8/2001 | Loveday et al. | 526/161 |
| 6,274,684 B1 | 8/2001 | Loveday et al. | 526/114 |
| 6,300,436 B1 | 10/2001 | Agapiou et al. | 526/154 |
| 6,339,134 B1 | 1/2002 | Crowther et al. | 526/128 |
| 6,340,730 B1 | 1/2002 | Murray et al. | 526/114 |
| 6,346,586 B1 | 2/2002 | Agapiou et al. | 526/160 |
| 6,359,072 B1 | 3/2002 | Whaley | 526/127 |
| 6,380,328 B1 | 4/2002 | McConville et al. | 526/119 |
| 6,407,177 B1 * | 6/2002 | Shamshoum et al. | 525/240 |
| 6,420,580 B1 | 7/2002 | Holtcamp et al. | 556/11 |
| 6,777,366 B2 | 8/2004 | Gauthier et al. | 502/117 |
| 6,777,367 B2 | 8/2004 | Gauthier et al. | 502/117 |
| 2002/0037979 A1 | 3/2002 | Job et al. | |

FOREIGN PATENT DOCUMENTS

| | | |
|---|---|---|
| EP | 0080202 | 11/1982 |
| EP | 0634421 | 1/1995 |
| EP | 0794200 | 9/1997 |
| WO | WO9807515 | 2/1998 |
| WO | WO9832775 | 7/1998 |

OTHER PUBLICATIONS

Chen, et al., "Cocatalysts for Metal-Catalyzed Olefin Polymerization: Activators, Activation Processes, and Structure-Activity Relationships", American Chemical Society, Published on Web Mar. 28, 2000, pp. 1391-1434.

Hlatky, et al., "Heterogeneous Single-Site Catalysts for Olefin Polymerization", American Chemical Society, Published on Web Mar. 4, 2000, pp. 1347-1376.

* cited by examiner

*Primary Examiner*—Roberto Rábago
(74) *Attorney, Agent, or Firm*—Diane L. Kilpatrick-Lee

(57) ABSTRACT

Disclosed is a method of polymerizing olefin using a compatible combination of a multi-site catalyst and a single-site catalyst. The catalysts may be a Ziegler-Natta catalyst and a metallocene catalyst. The resulting polymer, which may be a homopolymer or a random copolymer, may exhibit a molecular weight distribution which is intermediate than that resulting for polymers prepared using either catalyst alone.

17 Claims, No Drawings

CATALYST SYSTEM FOR PRODUCTION OF POLYOLEFINS

BACKGROUND OF THE INVENTION

1. Technical Field

This invention relates to the use of catalyst compositions and systems for polymerization of olefin polymers.

2. Background of the Art

Knowledge of the molecular weight distribution (MWD) of a polymer provides information that is useful in predicting how the polymer will behave during compounding and forming processes. For some applications, such as certain films and fibers, it is desirable to employ a polymer, particularly an olefinic polymer that exhibits a relatively broad MWD.

It is known that some traditional Ziegler-Natta catalysts, which are multi-site or heterogeneous catalysts, can be used to produce olefinic polymers having a relatively broad MWD. It is also known that, in contrast, some of the recently commercialized single-site catalysts, such as metallocene catalysts, tend to produce polymer chains of similar length that exhibit a narrower MWD. Nonetheless, for some types of polymers metallocene catalysts offer particularly desirable properties including, for example, improved processing characteristics, reduced levels of solvent-soluble fractions, and improved strength and toughness not generally attainable with Ziegler-Natta catalysts.

Applicable industries have used various means to broaden the MWD of olefinic polymers, and particularly those catalyzed using single-site catalysts such as metallocenes. For example, multiple olefin polymerization reactors have been operated in series in order to expose the polymerization catalyst to multiple hydrogen levels. The result is a metallocene-catalyzed olefinic polymer with a broader MWD, but the costs of such multiple reactors and potentially the costs of corresponding plant redesign to employ such multiple reactors is often prohibitive.

SUMMARY OF THE INVENTION

In one aspect, the invention is a method of polymerizing at least one olefin monomer to prepare a polymer, the method including contacting at least one olefin monomer having at least one Ziegler-Natta and metallocene polymerizable bond with at least one Ziegler-Natta catalyst system and at least one metallocene catalyst system in the presence of an activator under reaction conditions sufficient to prepare a polymer, wherein the MWD of the polymer produced is intermediate to the MWD of either polymer produced by either catalysts alone. In another aspect, the invention is a polymer including the product of polymerizing at least one olefin monomer to prepare a polymer including contacting at least one olefin monomer having at least one Ziegler-Natta and metallocene polymerizable bond with at least one Ziegler-Natta catalyst system and at least one metallocene catalyst system in the presence of an activator under reaction conditions sufficient to prepare a polymer, wherein the MWD of the polymer produced is intermediate to the MWD of either polymer produced by either catalysts alone.

In still another aspect, the invention is an article including a polymer produced by contacting at least one olefin monomer having at least one Ziegler-Natta and metallocene polymerizable bond with at least one Ziegler-Natta catalyst system and at least one metallocene catalyst system in the presence of an activator under reaction conditions sufficient to prepare a polymer, wherein the MWD of the polymer produced is intermediate to the MWD of either polymer produced by either catalysts alone.

DETAILED DESCRIPTION OF THE INVENTION

In one aspect, the invention provides a method by which the range of attainable molecular weight distributions (MWD's) may be broadened for olefinic polymer resins being made in a single reactor. As used herein, MWD, as obtained by gel permeation chromatography, refers to the result of the calculation by which the weight average molecular weight (Mw) is divided by the number average molecular weight (Mn), i.e., Mw/Mn. Such polymer resins include, but are not limited to, polypropylene homopolymer and random propylene-ethylene copolymers. This is accomplished by compatibly combining single-site and multi-site catalysts in the reactor during polymerization operations. The selection of appropriate catalysts for combination, and the conditions of their combination, may be significant in ensuring that adverse reactions between the two types, and undesirable effects thereof, do not occur or are minimized.

In another aspect, the invention provides a method of combining at least two catalysts in a single reactor to provide a polymer having the good processability of a polymer having a broad or high MWD, but also having a bimodal melting behavior. This occurs when the peak molecular weights of the polymers produced by the individual catalysts are relatively close and such that the MWD of the polymer produced by the combination of catalysts is intermediate to that of either polymer produced by either catalyst alone, but the polymers have melting characteristics that are sufficiently different that the polymer resulting from the mixed catalyst system has at least two distinct melting points. Such a polymer can be very useful in applications such as heat seal where it is desirable that the polymer have a comparatively low melting point for easy heat sealing but yet sufficient melt strength to maintain its structural integrity.

In one embodiment the invention is the combination of a specific type of Ziegler-Natta, i.e., a multi-site, catalyst with a metallocene, i.e., a single-site, catalyst. Ziegler-Natta catalysts may be described as complexes derived from a halide of a transition metal, for example, titanium, chromium or vanadium, with a metal hydride and/or a metal alkyl that is typically an organoaluminum compound. The Ziegler-Natta catalyst is desirably one that is suitable to polymerize the applicable olefinic starting material, for example, propylene, to form an olefinic product polymer. Such polymers may exhibit desirable MWD's ranging from about 4 to about 10, more typically from about 5 to about 8.

The multi-site, desirably Ziegler-Natta, catalyst may be a high activity catalyst, such as a $TiCl_4/MgCl_2$ type catalyst, which has a hydrogen response that is different from that of the metallocene catalyst. While it has been traditional for many Ziegler-Natta catalyst systems to include an external electron donor to reduce or limit the production of atactic polymer formation, some inventive embodiments do not include such a material, particularly where such may interfere with the single-site catalyst component. External electron donors that may result in such interference may include alkoxy silanes and aryl esters. In those cases where an external electron donor is not included in the polymerization, an internal electron donor is used and is particularly desirable where the goal is to reduce formation of atactic (xylene soluble) polyolefins. Internal electron donors that may be included in the catalyst system include, for example, members of the families represented by $R_2C(CH_2OR)_2$ sometimes referred to as diethers, and the like. Other similar diethers and polyethers may also be suitable.

The second component of the inventive catalyst system is the single-site catalyst. In one embodiment this is a metallocene catalyst. Metallocene catalysts may be characterized generally as coordination compounds incorporating one or more cyclopentadienyl (Cp) groups (which may be substituted or unsubstituted, each substitution being the same or different) coordinated with a transition metal through n bonding.

The Cp substituent groups may be linear, branched or cyclic hydrocarbyl radicals. The cyclic hydrocarbyl radicals may further form other contiguous ring structures, including, for example indenyl, azulenyl and fluorenyl groups. These additional ring structures may also be substituted or unsubstituted by hydrocarbyl radicals, such as $C_1$ to $C_{20}$ hydrocarbyl radicals.

A specific example of a metallocene catalyst is a bulky ligand metallocene compound generally represented by the formula:

where L is a bulky ligand, A is a leaving group, M is a transition metal and m and n are such that the total ligand valency corresponds to the transition metal valency. For example m may be from 1 to 3 and n may be from 1 to 3. The metal atom "M" of the metallocene catalyst compound, as described throughout the specification and claims, may be selected from Groups 3 through 12 atoms and lanthanide Group atoms in one embodiment; and selected from Groups 3 through 10 atoms in a more particular embodiment, and selected from Sc, Ti, Zr, Hf, V, Nb, Ta, Mn, Re, Fe, Ru, Os, Co, Rh, Ir, and Ni in yet a more particular embodiment; and selected from Groups 4, 5 and 6 atoms in yet a more particular embodiment, and Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated.

The bulky ligand generally includes a cyclopentadienyl group (Cp) or a derivative thereof. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

The Cp group typically includes ring fused ring(s) and/or substituted ring or fused ring systems. The ring(s) or ring system(s) typically include atoms selected from group 13 to 16 atoms, for example, carbon, nitrogen, oxygen, silicon, sulfur, phosphorous, germanium, boron, aluminum and combinations thereof, wherein carbon makes up at least 50% of the ring members. Non-limiting examples include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof, and heterocyclic versions thereof.

Cp substituent groups may include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls, optionally containing halogens such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each anionic leaving group is independently selected and may include any leaving group, such as halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; hydride, halogen ions, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of leaving groups include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of leaving groups include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more leaving groups form a part of a fused ring or ring system.

L and A may be bridged to one another. In catalysts where there are two L groups, they may be bridged to each other. A bridged metallocene, for example may, be described by the general formula:

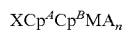

wherein X is a structural bridge, $Cp^A$ and $Cp^B$ each denote a cyclopentadienyl group, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups (X) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$, $RP=$ (wherein "=" represents two chemical bonds), where R is independently selected from the group hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more Rs may be joined to form a ring or ring system. In one embodiment, the bridged metallocene catalyst component has two or more bridging groups (X).

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl. The bridging groups may also have carbons or silicons having an olefinic substituent.

In another exemplary catalyst, the bridging group may also be cyclic, and include 4 to 10 ring members or 5 to 7 ring members in a more particular embodiment. The ring members may be selected from the elements mentioned above, and/or from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be cis-, trans-, or a combination thereof.

The cyclic bridging groups may be saturated or unsaturated and/or carry one or more substituents and/or be fused to one or more other ring structures. If present, the one or more substituents are selected from the group hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group of those having 4 to 10 ring members, more particularly 5, 6 or 7 ring members (selected from the group of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The metallocene catalysts also include the CpFlu family of catalysts (e.g., a metallocene incorporating a substituted Cp fluorenyl ligand structure) represented by the following formula:

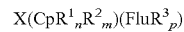

wherein Cp is a cyclopentadienyl group, Fl is a fluorenyl group, X is a structural bridge between Cp and $F^1$, $R^1$ is a substituent on the Cp, n is 1 or 2, $R^2$ is a substituent on the Cp at a position which is proximal to the bridge, m is 1 or 2, each $R^3$ is the same or different and is a hydrogen or a hydrocarbyl group having from 1 to 20 carbon atoms with $R^3$ being substituted on a nonproximal position on the fluorenyl group and at least one other $R^3$ being substituted at an opposed nonproximal position on the fluorenyl group and p is 2 or 4.

Another family of the metallocene catalyst includes bridged mono-ligand metallocene compounds (e.g., mono cyclopentadienyl catalyst components). In this embodiment, the at least one metallocene catalyst component is a bridged "half-sandwich" metallocene catalyst. In yet another aspect of the invention, the at least one metallocene catalyst component is an unbridged "half sandwich" metallocene.

Described another way, the "half sandwich" metallocenes above are described in U.S. Pat. Nos. 6,069,213, 5,026,798, 5,703,187, and 5,747,406, including a dimer or oligomeric structure, such as disclosed in, for example, U.S. Pat. Nos. 5,026,798 and 6,069,213, which are incorporated by reference herein. Non-limiting examples of metallocene catalyst components include:

cyclopentadienylzirconium$A_n$,
indenylzirconium$A_n$,
(1-methylindenyl)zirconium$A_n$,
(2-methylindenyl)zirconium$A_n$,
(1-propylindenyl)zirconium$A_n$,
(2-propylindenyl)zirconium$A_n$,
(1-butylindenyl)zirconium$A_n$,
(2-butylindenyl)zirconium$A_n$,
methylcyclopentadienylzirconium$A_n$,
tetrahydroindenylzirconium$A_n$,
pentamethylcyclopentadienylzirconium$A_n$,
cyclopentadienylzirconium$A_n$,
pentamethylcyclopentadienyltitanium$A_n$,
tetramethylcyclopentyltitanium$A_n$,
(1,2,4-trimethylcyclopentadienyl)zirconium$A_n$,
dimethylsilyl(1,2,3,4-tetramethylcyclopentadienyl)(cyclopentadienyl)zirconium$A_n$,
dimethylsilyl(1,2,3,4-tetramethylcyclopentadienyl)(1,2,3-rimethylcyclopentadienyl)zirconium$A_n$, dimethylsilyl(1,2,3,4-tetramethylcyclopentadienyl)(1,2-dimethylcyclopentadienyl)zirconiumA$_n$,
dimethylsilyl(1,2,3,4-tetramethylcyclopentadienyl)(2-methylcyclopentadienyl)zirconiumA$_n$,
dimethylsilylcyclopentadienylindenylzirconiumA$_n$,
dimethylsilyl(2-methylindenyl)(fluorenyl)zirconiumA$_n$,
diphenylsilyl(1,2,3,4-tetramethylcyclopentadienyl)(3-propylcyclopentadienyl)zirconiumA$_n$,
dimethylsilyl(1,2,3,4-tetramethylcyclopentadienyl)(3-t-butylcyclopentadienyl)zirconiumA$_n$,
dimethylgermyl(1,2-dimethylcyclopentadienyl)(3-isopropylcyclopentadienyl)zirconiumA$_n$,
dimethylsilyl(1,2,3,4-tetramethylcyclopentadienyl)(3-methylcyclopentadienyl)zirconiumA$_n$,
diphenylmethylidene(cyclopentadienyl)(9-fluorenyl)zirconiumA$_n$,
diphenylmethylidenecyclopentadienylindenylzirconiumA$_n$,
isopropylidenebiscyclopentadienylzirconiumA$_n$,
isopropylidene(cyclopentadienyl)(9-fluorenyl)zirconiumA$_n$,
isopropylidene(3-methylcyclopentadienyl)(9-fluorenyl)zirconiumA$_n$,
ethylenebis(9-fluorenyl)zirconiumA$_n$,
mesoethylenebis(1-indenyl)zirconiumA$_n$,
ethylenebis(1-indenyl)zirconiumA$_n$,
ethylenebis(2-methyl-1-indenyl)zirconiumA$_n$,
ethylenebis(2-methyl-4,5,6,7-tetrahydro-1-indenyl)zirconiumA$_n$,
ethylenebis(2-propyl-4,5,6,7-tetrahydro-1-indenyl)zirconiumA$_n$,
ethylenebis(2-isopropyl-4,5,6,7-tetrahydro-1-indenyl)zirconiumA$_n$,
ethylenebis(2-butyl-4,5,6,7-tetrahydro-1-indenyl)zirconiumA$_n$,
ethylenebis(2-isobutyl-4,5,6,7-tetrahydro-1-indenyl)zirconiumA$_n$,
dimethylsilyl(4,5,6,7-tetrahydro-1-indenyl)zirconiumA$_n$,
diphenyl(4,5,6,7-tetrahydro-1-indenyl)zirconiumA$_n$,
ethylenebis(4,5,6,7-tetrahydro-1-indenyl)zirconiumA$_n$,
dimethylsilylbis(cyclopentadienyl)zirconiumA$_n$,
dimethylsilylbis(9-fluorenyl)zirconiumA$_n$,
dimethylsilylbis(1-indenyl)zirconiumA$_n$,
dimethylsilylbis(2-methylindenyl)zirconiumA$_n$,
dimethylsilylbis(2-propylindenyl)zirconiumA$_n$,
dimethylsilylbis(2-butylindenyl)zirconiumA$_n$,
diphenylsilylbis(2-methylindenyl)zirconiumA$_n$,
diphenylsilylbis(2-propylindenyl)zirconiumA$_n$,
diphenylsilylbis(2-butylindenyl)zirconiumA$_n$,
dimethylgermylbis(2-methylindenyl)zirconiumA$_n$,
dimethylsilylbistetrahydroindenylzirconiumA$_n$,
dimethylsilylbistetramethylcyclopentadienylzirconiumA$_n$,
dimethylsilyl(cyclopentadienyl)(9-fluorenyl)zirconiumA$_n$,
diphenylsilyl(cyclopentadienyl)(9-fluorenyl)zirconiumA$_n$,
diphenylsilylbisindenylzirconiumA$_n$,
cyclotrimethylenesilyltetramethylcyclopentadienylcyclopentadienylzirconiumA$_n$,
cyclotetramethylenesilyltetramethylcyclopentadienylcyclopentadienylzirconiumA$_n$,
cyclotrimethylenesilyl(tetramethylcyclopentadienyl)(2-methylindenyl)zirconiumA$_n$,
cyclotrimethylenesilyl(tetramethylcyclopentadienyl)(3-methylcyclopentadienyl)zirconiumA$_n$,
cyclotrimethylenesilylbis(2-methylindenyl)zirconiumA$_n$,
cyclotrimethylenesilyl(tetramethylcyclopentadienyl)(2,3,5-trimethylclopentadienyl)zirconiumA$_n$,
cyclotrimethylenesilylbis(tetramethylcyclopentadienyl)zirconiumA$_n$,
dimethylsilyl(tetramethylcyclopentadieneyl)(N-tertbutylamido)titaniumA$_n$,
biscyclopentadienylchromiumA$_n$,
biscyclopentadienylzirconiumA$_n$,
bis(n-butylcyclopentadienyl)zirconiumA$_n$,
bis(n-dodecycicyclopentadienyl)zirconiumA$_n$,
bisethylcyclopentadienylzirconiumA$_n$,
bisisobutylcyclopentadienylzirconiumA$_n$,
bisisopropylcyclopentadienylzirconiumA$_n$,
bismethylcyclopentadienylzirconiumA$_n$,
bisnoxtylcyclopentadienylzirconiumA$_n$,
bis(n-pentylcyclopentadienyl)zirconiumA$_n$,
bis(n-propylcyclopentadienyl)zirconiumA$_n$,
bistrimethylsilylcyclopentadienylzirconiumA$_n$,
bis(1,3-bis(trimethylsilyl)cyclopentadienyl)zirconiumA$_n$,
bis(1-ethyl-2-methylcyclopentadienyl)zirconiumA$_n$,
bis(1-ethyl-3-methylcyclopentadienyl)zirconiumA$_n$,
bispentamethylcyclopentadienylzirconiumA$_n$,
bispentamethylcyclopentadienylzirconiumA$_n$,
bis(1-propyl-3-methylcyclopentadienyl)zirconiumA$_n$,
bis(1-n-butyl-3-methylcyclopentadienyl)zirconiumA$_n$,
bis(1-isobutyl-3-methylcyclopentadienyl)zirconiumA$_n$,
bis(1-propyl-3-butylcyclopentadienyl)zirconiumA$_n$,
bis(1,3-n-butylcyclopentadienyl)zirconiumA$_n$,
bis(4,7-dimethylindenyl)zirconiumA$_n$,
bisindenylzirconiumA$_n$,
bis(2-methylindenyl)zirconiumA$_n$,
cyclopentadienylindenylzirconiumA$_n$,
bis(n-propylcyclopentadienyl)hafniumA$_n$,
bis(n-butylcyclopentadienyl)hafniumA$_n$,
bis(n-pentylcyclopentadienyl)hafniumA$_n$,
(n-propylcyclopentadienyl)(n-butylcyclopentadienyl)hafniumA$_n$,
bis[(2-trimethylsilylethyl)cyclopentadienyl]hafniumA$_n$,
bis(trimethylsilylcyclopentadienyl)hafniumA$_n$,
bis(2-n-propylindenyl)hafniumA$_n$,
bis(2-n-butylindenyl)hafniumA$_n$,
dimethylsilylbis(n-propylcyclopentadienyl)hafniumA$_n$,
dimethylsilylbis(n-butylcyclopentadienyl)hafniumA$_n$,
bis(9-n-propylfluorenyl)hafniumA$_n$,
bis(9-n-butylfluorenyl)hafniumA$_n$,
(9-n-propylfluorenyl)(2-n-propylindenyl)hafniumA$_n$,
bis(1-n-propyl-2-methylcyclopentadienyl)hafniumA$_n$,
(n-propylcyclopentadienyl)(1-n-propyl-3-n-butylcyclopentadienyl)hafniumA$_n$,
dimethylsilyltetramethylcyclopentadienylcyclopropylamidotitaniumA$_n$,
dimethylsilyltetramethylcyclopentadienylcyclobutylamidotitaniumA$_n$,
dimethylsilyltetramethylcyclopentadienylcyclopentylamidotitaniumA$_n$,
dimethylsilyltetramethylcyclopentadienylcyclohexylamidotitaniumA$_n$,
dimethylsilyltetramethylcyclopentadienylcycloheptylamidotitaniumA$_n$,
dimethylsilyltetramethylcyclopentadienylcyclooctylamidotitaniumA$_n$,
dimethylsilyltetramethylcyclopentadienylcyclononylamidotitaniumA$_n$,
dimethylsilyltetramethylcyclopentadienylcyclodecylamidotitaniumA$_n$,
dimethylsilyltetramethylcyclopentadienylcycloundecylamidotitaniumA$_n$,
dimethylsilyltetramethylcyclopentadienylcyclododecylamidotitaniumA$_n$,
dimethylsilyltetramethylcyclopentadienyl(sec-butylamido)titaniumA$_n$, dimethylsilyl(tetramethylcyclopentadienyl)(n-octylamido)titanium$A_n$,
dimethylsilyl(tetramethylcyclopentadienyl)(n-decylamido)titanium$A_n$,
dimethylsilyl(tetramethylcyclopentadienyl)(n-octadecylamido)titanium$A_n$,
methylphenylsilyltetramethylcyclopentadienylcyclopropylamidotitanium$A_n$,
methylphenylsilyltetramethylcyclopentadienylcyclobutylamidotitanium$A_n$,
methylphenylsilyltetramethylcyclopentadienylcyclopentylamidotitanium$A_n$,
methylphenylsilyltetramethylcyclopentadienylcyclohexylamidotitanium$A_n$,
methylphenylsilyltetramethylcyclopentadienylcycloheptylamidotitanium$A_n$,
methylphenylsilyltetramethylcyclopentadienylcyclooctylamidotitanium$A_n$,
methylphenylsilyltetramethylcyclopentadienylcyclononylamidotitanium$A_n$,
methylphenylsilyltetramethylcyclopentadienylcyclodecylamidotitanium$A_n$,
methylphenylsilyltetramethylcyclopentadienylcycloundecylamidotitanium$A_n$,
methylphenylsilyltetramethylcyclopentadienylcyclododecylamidotitanium$A_n$,
methylphenylsilyl(tetramethylcyclopentadienyl)(sec-butylamido)titanium$A_n$,
methylphenylsilyl(tetramethylcyclopentadienyl)(n-octylamido)titanium$A_n$,
methylphenylsilyl(tetramethylcyclopentadienyl)(n-decylamido)titanium$A_n$,
methylphenylsilyl(tetramethylcyclopentadienyl)(n-octadecylamido)titanium$A_n$,
diphenylsilyltetramethylcyclopentadienylcyclopropylamidotitanium$A_n$,
diphenylsilyltetramethylcyclopentadienylcyclobutylamidotitanium$A_n$,
diphenylsilyltetramethylcyclopentadienylcyclopentylamidotitanium$A_n$,
diphenylsilyltetramethylcyclopentadienylcyclohexylamidotitanium$A_n$,
diphenylsilyltetramethylcyclopentadienylcycloheptylamidotitanium$A_n$,
diphenylsilyltetramethylcyclopentadienylcyclooctylamidotitanium$A_n$,
diphenylsilyltetramethylcyclopentadienylcyclononylamidotitanium$A_n$,
diphenylsilyltetramethylcyclopentadienylcyclodecylamidotitanium$A_n$,
diphenylsilyltetramethylcyclopentadienylcycloundecylamidotitanium$A_n$,
diphenylsilyltetramethylcyclopentadienylcyclododecylamidotitanium$A_n$,
diphenylsilyl(tetramethylcyclopentadienyl)(sec-butylamido)titanium$A_n$,
diphenylsilyl(tetramethylcyclopentadienyl)(n-octylamido)titanium$A_n$,
diphenylsilyl(tetramethylcyclopentadienyl)(n-decylamido)titanium$A_n$,
diphenylsilyl(tetramethylcyclopentadienyl)(n-octadecylamido)titanium$A_n$, and derivatives thereof.

As used herein, the term "metallocene activator" is defined to be any compound or combination of compounds, supported or unsupported, which may activate a single-site catalyst compound (e.g., metallocenes, Group 15 containing catalysts, etc.) Typically, this involves the abstraction of at least one leaving group (A group in the formulas/structures above, for example) from the metal center of the catalyst component. The catalyst components of the present invention are thus activated towards olefin polymerization using such activators. Embodiments of such activators include Lewis acids such as cyclic or oligomeric polyhydrocarbylaluminum oxides and so called non-coordinating ionic activators ("NCA"), alternately, "ionizing activators" or "stoichiometric activators", or any other compound that may convert a neutral metallocene catalyst component to a metallocene cation that is active with respect to olefin polymerization.

More particularly, it is within the scope of this invention to use Lewis acids such as the aluminoxanes as activators. Aluminoxanes are well known in the art and can be made by conventional methods, such as, for example admixing an aluminum alkyl with water. Nonhydrolytic routes to form these materials are also known Traditionally, the most widely used aluminoxane is methylaluminoxane (MAO), an aluminoxane compound in which the alkyl groups are methyls. Aluminoxanes with higher alkyl groups include hexaisobutylalumoxane (HIBAO) isobutylaluminoxane, ethylaluminoxane, butylaluminoxane, heptylaluminoxane and methyl-butylaluminoxane; and combinations thereof. Modified aluminoxanes (e.g., "MMAO"), may olso be used. The use of MAO and other aluminum-based activators in polyolefin polymerizations as activators are well known in the art.

Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds, and mixtures thereof (e.g., tri(n-butyl)ammonium tetrakis(pentafluorophenyl)boron and/or trisperfluorophenyl boron metalloid precursors). The three substituent groups are each independently selected from alkyls, alkenyls, halogen, substituted alkyls, aryls, arylhalides, alkoxy and halides. In one embodiment, the three groups are independently selected from the group of halogen, mono or multicyclic (including halosubstituted) aryls, alkyls, and alkenyl compounds and mixtures thereof. In another embodiment, the three groups are selected from the group alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group alkyls having 1 to 4 carbon groups, phenyl, naphthyl and mixtures thereof. In yet another embodiment, the three groups are selected from the group highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from fluorine, chlorine and bromine. In yet another embodiment, the neutral stoichiometric activator is a tri-substituted Group 13 compound comprising highly fluorided aryl groups, the groups being highly fluorided phenyl and highly fluorided naphthyl groups.

Illustrative, not limiting examples of ionic ionizing activators include trialkyl-substituted ammonium salts such as:
triethylammoniumtetraphenylboron,
tripropylammoniumtetraphenylboron,
tri(n-butyl)ammoniumtetraphenylboron,
trimethylammoniumtetra(p-tolyl)boron,
trimethylammoniumtetra(o-tolyl)boron, tributylammoniumtetra(pentafluorophenyl)boron,
tripropylammoniumtetra(o,p-dimethylphenyl)boron,
tributylammoniumtetra(m,m-dimethylphenyl)boron,
tributylammoniumtetra(p-tri-fluoromethylphenyl)boron,
tributylammoniumtetra(pentafluorophenyl)boron,
tri(n-butyl)ammoniumtetra(o-tolyl)boron, and the like;
N,N-dialkylanilinium salts such as:
N,N-dimethylaniliniumtetraphenylboron,
N,N-diethylaniliniumtetraphenylboron,
N,N-2,4,6-pentamethylaniliniumtetraphenylboron and the like;
dialkyl ammonium salts such as:
diisopropylammoniumtetrapentafluorophenylboron,
dicyclohexylammoniumtetraphenylboron and the like;
triaryl phosphonium salts such as:
triphenylphosphoniumtetraphenylboron,
trimethylphenylphosphoniumtetraphenyl boron,
tridimethylphenylphosphoniumtetraphenylboron, and the like, and their aluminum equivalents.

In yet another embodiment, an alkylaluminum may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituents groups may also be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine, and selected from the group consisting of fluorine and bromine in another embodiment, and the halogen is fluorine in yet another embodiment.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5,-dimethylpyrroles, 3-pentafluorophenylpyrrole, 4,5,6,7-tetrafluoroindole or 3,4-difluoropyrroles.

Other activators include those described in WO 98/07515 such as tris(2,2',2"-nonafluorobiphenyl)fluoroaluminate, which is incorporated by reference herein. Combinations of activators are also contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate)-4T-HF; silylium salts in combination with a non-coordinating compatible anion. Also, methods of activation such as using radiation, electro-chemical oxidation, and the like are also contemplated as activating methods for the purposes of rendering the neutral metallocene-type catalyst compound or precursor to a metallocene-type cation capable of polymerizing olefins. Other activators or methods for activating a metallocene-type catalyst compound are described in for example, U.S. Pat. Nos. 5,849,852, 5,859,653 and 5,869,723; and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (e.g., Al from MAO:Zr from metallocene) ranges from 40 to 500 in one embodiment, ranges from 50 to 400 in another embodiment, ranges from 60 to 300 in yet another embodiment, ranges from 70 to 200 in yet another embodiment, ranges from 80 to 175 in yet another embodiment; and ranges from 90 to 125 in yet another embodiment, wherein a desirable molar ratio of Al(MAO) to metallocene-metal "M" may be any combination of any upper limit with any lower limit described herein.

The activators may or may not be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) *CHEMICAL REVIEWS* 1347-1374 (2000).

In one embodiment, the heterocyclic compound described above is combined with an alkyl aluminum scavenger. The alkyl aluminum compounds can remove or mitigate materials such as water and oxygen that could otherwise interfere with the metallocene catalysts. Non-limiting examples of alkylaluminums include trimethylaluminum, triethylaluminum (TEAL), triisobutylaluminum (TIBAL), tri-n-hexylaluminum, tri-n-octylaluminum, tri-iso-octylaluminum, triphenylaluminum, and combinations thereof. While most often used as scavengers, the compounds can also, in some applications, function as cocatalysts or activators also. One of ordinary skilled in the art of performing metallocene catalyzed polyolefin polymerizations will be versed in selecting and employing such scavengers.

Metallocene Catalysts may be supported or unsupported. Typical support materials may include talc, inorganic oxides, clays and clay minerals, ion-exchanged layered compounds, diatomaceous earth compounds, zeolites or a resinous support material, such as a polyolefin.

Specific inorganic oxides include silica, alumina, magnesia, titania and zirconia, for example. The inorganic oxides used as support materials may have an average particle size of from 5 microns to 600 microns, or from 10 microns to 100 microns, a surface area of from 50 $m^2/g$ to 1,000 $m^2/g$, or from 100 $m^2/g$ to 400 $m^2/g$, a pore volume of from 0.5 cc/g to 3.5 cc/g, or from 0.5 cc/g to 2 cc/g.

Desirable methods for supporting metallocene ionic catalysts are known in the art and described in, for example, U.S. Pat. No. 5,643,847, which is incorporated by reference herein. The methods generally include reacting neutral anion precursors that are sufficiently strong Lewis acids with the hydroxyl reactive functionalities present on the silica surface such that the Lewis acid becomes covalently bound.

When the activator for the metallocene supported catalyst composition is a NCA, desirably the NCA is first added to the support composition followed by the addition of the metallocene catalyst. In some processes, when the activator is MAO, the MAO and metallocene catalyst may be dissolved together in solution. The support is then contacted with the MAO/metallocene catalyst solution. In another embodiment of the process, MAO is first reacted with silica and then a metallocene is added to prepare a catalyst. Other methods and order of addition will be apparent to those skilled in the art. Such processes are known in the art and disclosed in, for example, U.S. Pat. Nos. 6,777,366 and 6,777,367, both to Gauthier, et al., and incorporated herein by reference.

In general metallocene catalysts are useful to produce, in discrete olefinic polymerizations, a polymer having an MWD of from about 1 to about 5. As used herein, the term "discrete" refers to polymerizations using a single catalyst, which therefore refers to polymerizations that may be useful for comparative purposes but which by definition do not use the inventive combination catalyst system. Such comparative catalysts may be either single-site or multi-site, e.g., metallocene or Ziegler-Natta, but not both. In embodiments of the invention, the combination of the multi-site, desirably Ziegler-Natta, catalyst, and the single-site, desirably metallocene, catalyst, may produce a polymer having an MWD that may desirably range from about 1 to about 10 polydisperity units. In other embodiments the resulting MWD may range from about 2 to about 8 polydisperity units, and in still other embodiments the MWD may range from about 5 to about 8.

In general the single-site catalyst is selected to produce predominant levels of desirable shorter chain polymer molecules, i.e., those having a lower weight average molecular weight, and the multi-site, desirably Ziegler-Natta, catalyst is selected to produce predominant levels of desirable longer chain polymer molecules, the result being an overall MWD that may be broader than that of similar polymer produced using either catalyst alone if the peak molecular weights of the two polymers are sufficiently different. If the peak molecular weights of the two polymers are similar enough, the MWD is not broadened, but the two polymers may have other properties, such as melting point, that are different enough to be measurable in the polymer produced by the mixed catalyst system and provide desirable properties not present in either polymer alone.

The inventive catalyst system is useful for the polymerization, including homopolymerization, of olefinic starting materials including, for example, monomers and prepolymers. Such material desirably has at least one Ziegler-Natta polymerizable bond. For example, notable benefits may be seen with ethylene and other α-olefins such as propylene and butylene. Other useful olefinic monomers include, for example, hexene and octene, mixtures thereof, and the like. As used herein, the term Ziegler-Natta polymerizable bond refers to monomers, such as alpha-olefins and other unsaturated monomers, that can be polymerized using a Ziegler-Natta catalyst system. The olefinic polymerization may be used to prepare homopolymers and copolymers, including but not limited to random copolymers, or in general to prepare multi-mer polymers including, but not limited to, terpolymers.

Examples of final products include polypropylene, propylene-ethylene random copolymers, propylene-butylene copolymers, propylene-ethylene-butene terpolymers, and the like.

Preparations may be accomplished in appropriate polymerization reactors such as those designed for liquid-phase, gas-phase, high-pressure or slurry polymerization, or in reactors designed for combinations of these approaches. Routine engineering analysis, modeling, and ordinary experimentation may be useful in ensuring that a desired polymerization may be effectively accomplished within a given reactor type and configuration.

In some embodiments the product olefinic polymer resins may desirably display a bimodal MWD, i.e., one that shows significant proportions of the resin having molecular weights concentrated around two different polydisperities along the MWD curve. A non-limiting illustrative example of a bimodal resin may have one concentration at from about 2 to about 4 polydisperity units, and another at from about 6 to about 8 polydisperity units. Polymodal distributions are also envisioned in some embodiments.

Olefinic polymers produced herein may include in various embodiments those that may be utilized to prepare a wide variety of articles. Such articles may include, but are not necessarily limited to, sheets, films, laminates, and injection and blow-molded products, such as bottles. Other possible uses include heat seal applications.

The following examples are provided to illustrate the invention and are not intended to be limitative of its scope in any way. Although the present invention has been described in some detail, those skilled in the art will understand that changes, modifications, substitutions and alterations, in addition to those listed explicitly herein, may be made to the invention without departing from the spirit and scope hereof. For example, such additional embodiments may relate to specific selections of catalysts and reactants, reaction conditions, catalyst preparation and combination methods, and the like.

EXAMPLES

Example 1

Six polymerizations to prepare propylene homopolymers are carried out to determine the activity of a multi-site/single-site catalyst combination at various proportions and compare thereto the activity of each catalyst used alone. The selected catalysts are RH-220, a Mitsui catalyst defined as a diether-based Ziegler-Natta catalyst (ZN1) and a second catalyst defined as a 1 percent loading of racemic $Me_2Si(2-Me-4-Phind)_2ZrCl_2$, supported on silica and activated by 0.7/1 methylaluminoxane (MAO) (M1). The second catalyst is used as an 8.87 weight percent slurry (2 weight percent metallocene contained in the catalyst).

To combine the catalysts, a 10 mL stainless steel bomb is charged, in a glove box, with slurries of each catalyst in mineral oil. Triethylaluminum is added as a heptane solution. The bomb is then fitted to the reactor and propylene is flushed through. Hydrogen (0.038 mole percent of feed propylene) is concurrently added and the reactor is brought to 70° C. over about 5 minutes. Polymerization of propylene to form a polypropylene homopolymer is allowed to proceed for about 30 minutes, and volatiles are then flashed. The resulting polymer is desirably film or fiber grade.

The polymer is then analyzed to determine its properties as shown in Table 1. Test method used include ASTM D1238-95 for melt flow, ASTM-D5492 for xylenes solubles, and ASTM-D3593 for MWD. The results generally show that, for the combination catalyst system, as the ratio of the single-site catalyst to the Ziegler-Natta catalyst is increased, the MWD and xylene solubles of the polymers produced by the combined system decreases. Melt flows are those useful for, in particular, films or fibers.

TABLE 1

| Run | ZN cat. (mg) | M1 cat. (mg) | Total cat. (mg) | TEAl (mmol) | Yield (g) | Melt Flow (g/10 min) | XS (wt. %) | BD (g/cc) | MWD (Mw/Mn) |
|---|---|---|---|---|---|---|---|---|---|
| 1* | — | 15 | 15 | 0.5 | 128 | 8 | 0.3 | 0.42 | 2.9 |
| 2* | 5 | — | 5 | 1 | 140 | 2.3 | 4.5 | 0.37 | 7.9 |
| 3 | 10 | 5 | 15 | 2.17 | 242 | 1.9 | 4.4 | 0.39 | 7.7 |
| 4 | 5 | 5 | 10 | 1.17 | 168 | 2.5 | 4.1 | 0.4 | 7.4 |
| 5 | 5 | 15 | 20 | 1.5 | 206 | 3.2 | 3.4 | 0.41 | 6.1 |
| 6 | 5 | 30 | 35 | 2 | 252 | 1.8 | 1.8 | 0.43 | 6.0 |

*means comparative example; not an example of the invention
— means none added or no data taken, according to context
XS means xylene solubles
BD means bulk density (g/cc).

Example 2

A series of random propylene-ethylene copolymers is prepared to compare two different Ziegler-Natta catalysts and one metallocene catalyst, alone and in inventive combination of one of the Ziegler-Natta catalysts with the metallocene catalyst. The metallocene catalyst is the same as is used in Example 1. The Ziegler-Natta catalysts are RH220 (Z-N cat A), already defined, and RH-540 (Z-N cat B), also a diether based Mitsui Ziegler-Natta catalyst. Reaction conditions are the same as those used in Example 1. Results are shown in Table 2. These results generally show that for the combination catalyst system there is better incorporation of ethylene than when using a metallocene alone, and better xylene solubles control than when using ZN catalyst alone.

What we claim is:

1. A method of polymerizing at least one olefin monomer to prepare a polymer comprising contacting at least one olefin monomer having at least one Ziegler-Natta and metallocene polymerizable bond with at least one Ziegler-Natta catalyst system and at least one metallocene catalyst system in the presence of an activator under reaction conditions sufficient to prepare a polymer, wherein the MWD of the polymer produced is intermediate to the MWD of either polymer produced by either catalyst alone, and wherein the Ziegler-Natta catalyst system is a diether based Ziegler-Natta catalyst system.

2. The method of claim 1 wherein the Ziegler-Natta catalyst system forms a polymer having a first MWD range and the metallocene catalyst system forms a polymer having a second and different MWD range.

3. The method of claim 1 wherein the metallocene catalyst system is a bis-indenyl catalyst system or a CpFlu catalyst system.

4. The method of claim 1 wherein the at least one olefin monomer is contacted with the Ziegler-Natta catalyst system and the metallocene catalyst system in a single reactor.

5. The method of claim 4 wherein the Ziegler-Natta catalyst system and the metallocene catalyst system are admixed before being introduced into the single reactor.

TABLE 2

| Run | Z-N cat. A (mg) | Z-N cat. B (mg) | m-cat. (mg) | TEAl (mmol) | Added $C_2$ (g) | Found $C_2$** (wt %) | Yield (g) | Melt Flow (g/10 min) | XS wt. % | BD |
|---|---|---|---|---|---|---|---|---|---|---|
| 7* | 5 | — | — | 1.00 | 5.00 | 4.40 | 200 | 2.0 | 10.0 | — |
| 8* | — | — | 15 | 0.50 | 5.00 | 0.90 | 155 | 7.4 | 0.3 | 0.41 |
| 9 | 5 | — | 15 | 1.50 | 5.00 | 3.50 | 234 | 2.4 | 6.8 | — |
| 10 | 5 | — | 15 | 1.50 | 2.50 | 1.80 | 228 | 2.3 | 5.5 | 0.36 |
| 11* | — | 5 | — | 1.00 | 5.00 | 4.10 | 152 | 1.7 | 7.4 | 0.26 |
| 12* | — | — | 15 | 0.50 | 5.00 | 0.90 | 155 | 7.4 | 0.3 | 0.41 |
| 13 | — | 5 | 15 | 1.50 | 5.00 | 3.20 | 202 | 2.6 | 5.2 | 0.27 |
| 14 | — | 5 | 15 | 1.50 | 2.50 | 1.60 | 195 | 2.5 | 2.2 | 0.31 |

$C_2$ means ethylene
*means comparative example; not an example of the invention
**determined by infrared (IR) spectroscopy
— means none added or no data taken, according to context
XS means xylene solubles
BD means bulk density (g/cc)

6. The method of claim 4 wherein the Ziegler-Natta catalyst system and the metallocene catalyst system are introduced separately into the single reactor.

7. The method of claim 1 wherein the at least one olefin monomer is contacted sequentially with the Ziegler-Natta catalyst system and the metallocene catalyst system.

8. The method of claim 1 wherein the Ziegler-Natta catalyst system does not include an external electron donor.

9. The method of claim 1 wherein the Ziegler-Natta catalyst system comprises an internal electron donor represented by $R_2C(CH_2OR)_2$ wherein R is a hydrocarbyl or substituted hydrocarbyl having from 1 to 20 carbon atoms.

10. The method of claim 1 wherein the reactor is selected from the group consisting of reactors designed for liquid-phase, gas-phase, high-pressure and slurry polymerizations.

11. The method according to claim 1 wherein the polymer is selected from the group consisting of homopolymers, copolymers.

12. The method of claim 1 wherein the polymer has an MWD of from about 4 to about 10.

13. The method of claim 12 wherein the polymer has an MWD of from about 5 to about 8.

14. The method of claim 1 wherein the polymer has a bimodal melting point.

15. The method of claim 1 wherein the olefin monomer is propylene.

16. The method of claim 15 additionally comprising including a co-monomer.

17. The method of claim 16 wherein the comonomer is ethylene.

* * * * *

UNITED STATES PATENT AND TRADEMARK OFFICE
CERTIFICATE OF CORRECTION

PATENT NO. : 7,645,834 B2  Page 1 of 1
APPLICATION NO. : 11/118017
DATED : January 12, 2010
INVENTOR(S) : Kenneth P. Blackmon et al.

It is certified that error appears in the above-identified patent and that said Letters Patent is hereby corrected as shown below:

Title Page, Item (73) Assignee:

"Fina Technologies, Inc., Houston, TX (US)" should read --Fina Technology, Inc., Houston, TX (US)--.

Signed and Sealed this

Sixteenth Day of March, 2010

David J. Kappos
*Director of the United States Patent and Trademark Office*